US007551665B2

(12) United States Patent
Tian

(10) Patent No.: US 7,551,665 B2
(45) Date of Patent: Jun. 23, 2009

(54) ULTRA WIDEBAND RECEIVER ARCHITECTURE USING HIGH ORDER GAUSSIAN PULSES AND METHOD OF OPERATION

(75) Inventor: Tong Tian, Singapore Science Park II (SG)

(73) Assignee: Agency for Science, Technology and Research, Singapore (SG)

( * ) Notice: Subject to any disclaimer, the term of this patent is extended or adjusted under 35 U.S.C. 154(b) by 458 days.

(21) Appl. No.: 10/986,523

(22) Filed: Nov. 10, 2004

(65) Prior Publication Data
US 2006/0098713 A1     May 11, 2006

(51) Int. Cl.
*H04B 1/00* (2006.01)
(52) U.S. Cl. ............... 375/147; 375/130; 375/295; 375/316; 375/345; 370/319; 370/320; 370/321; 370/330; 370/335; 370/342; 370/345; 370/347; 333/193; 333/194; 333/195; 333/196; 342/150; 342/151; 342/152; 342/153; 342/154; 342/155
(58) Field of Classification Search ............... 375/147, 375/295, 316, 345, 130; 370/319, 320, 321, 370/330, 335, 342, 345, 347; 333/193, 194, 333/195, 196; 342/150, 151, 152, 153, 154, 342/155
See application file for complete search history.

(56) References Cited

U.S. PATENT DOCUMENTS 6,625,229 B2   9/2003   Dress et al. ............... 375/295

| 2002/0146080 | A1* | 10/2002 | Dress, Jr. et al. | ............ 375/316 |
| 2003/0227984 | A1* | 12/2003 | Batra et al. | ................. 375/340 |
| 2004/0180642 | A1* | 9/2004 | Elmala et al. | ............... 455/306 |
| 2005/0265428 | A1* | 12/2005 | McCorkle | .................... 375/130 |

OTHER PUBLICATIONS

Welborn, et al., The Importance of Fractional Bandwidth in Ultra-Wideband Pulse Design, 2002 IEEE 753 (2002).

* cited by examiner

*Primary Examiner*—Shuwang Liu
*Assistant Examiner*—Helene Tayong
(74) *Attorney, Agent, or Firm*—K. David Crockett, Esq.; Crockett & Crockett

(57) ABSTRACT

An ultra wideband (UWB) receiver system operable to process a high order Gaussian pulse includes an integrator group, a correlator circuit and a comparator circuit. The integrator group includes an input coupled to receive the high order Gaussian pulse and an output coupled to the correlator circuit, the integrator group having two or more successively coupled integration stages, each integration stage operable to integrate, over a predefined time period, the signal received thereby, the integrator group operable to output, in response, a lower order Gaussian pulse. The correlator circuit is coupled to receive the lower order Gaussian pulse, and is operable to output a correlated output signal corresponding to the correlation between the lower order Gaussian pulse and a predefined reference signal. The comparator circuit is coupled to receive the correlated output data, and is operable to compare the correlated output data to one or more predefined values for construct a data stream representing modulation data of the high order Gaussian pulse.

26 Claims, 6 Drawing Sheets

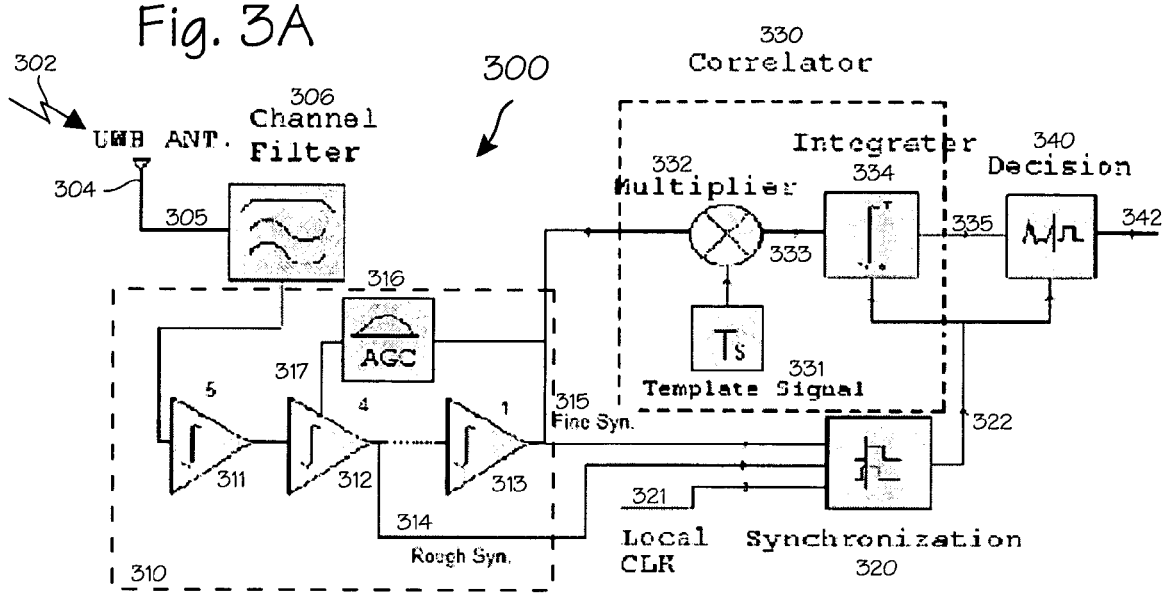

Fig. 3A

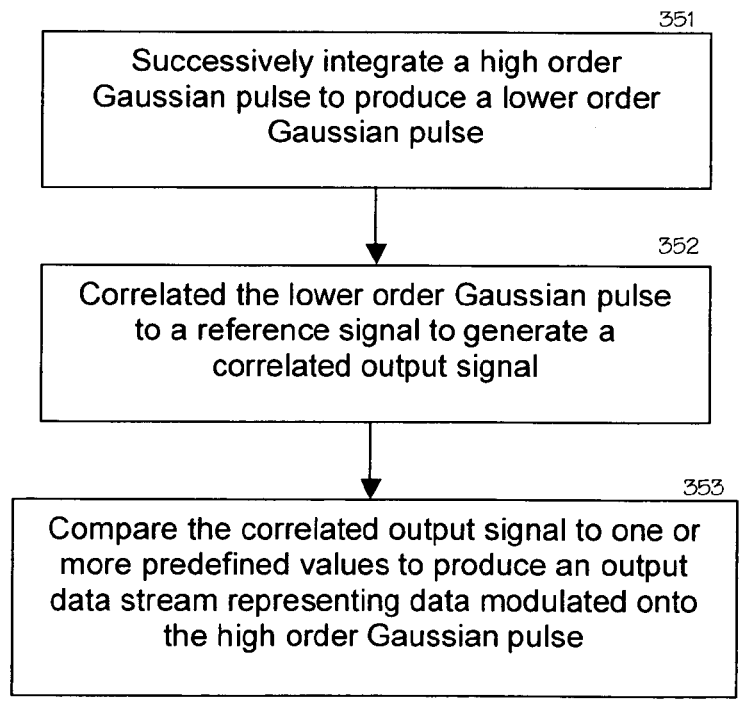

Fig. 3B

351
Successively integrate a high order Gaussian pulse to produce a lower order Gaussian pulse 352
Correlated the lower order Gaussian pulse to a reference signal to generate a correlated output signal 353
Compare the correlated output signal to one or more predefined values to produce an output data stream representing data modulated onto the high order Gaussian pulse

ULTRA WIDEBAND RECEIVER ARCHITECTURE USING HIGH ORDER GAUSSIAN PULSES AND METHOD OF OPERATION

FIELD OF THE INVENTIONS

The present invention relates to receiver systems and in particular to ultra wideband receiving systems and methods of operation.

BACKGROUND

Ultra wideband (UWB) communications are emerging as an important protocol for providing high speed, low power, and multi-path resilient communications. UWB signals consist of a train of extremely narrow pulses, typically on the order of 0.2-2.0 nanosecond ($10^{-9}$ s). Usually, the transmitted pulse (typically Gaussian in shape) represents the modulation or baseband data, and accordingly, UWB systems are sometimes referred to as "carrier-less" systems, as the modulation signal is not translated to another frequency for transmission. Further, as the pulse width is very short compared to the pulse period, UWB signals occupy a very broad communication band at low power levels, making signal recovery extremely challenging.

FIG. 1 illustrates an exemplary Gaussian signal UWB receiver known in the art. The system 100 includes a UWB antenna 102, front-end filter 104, front-end amplifier 106, correlator 110, and backend circuitry 120. During reception, a UWB signal 101 is collected by the UWB antenna 102, and front-end filter 104 operates to limit the input bandwidth and reduce signal strength at image frequencies. Front-end amplifier 106 provides additional signal strength with some addition of noise. Importantly, the front-end amplifier 106 is required to provide sufficient gain over the entire UWB bandwidth, which may extend 1-7 GHz ($\times 10^9$ Hz). Such a large gain-bandwidth product is difficult to provide, and typically results in degraded performance over the entire UWB bandwidth as compared to the amplifier's performance over a narrower band. The front-end amplifier's marginal performance places a high signal to noise ratio (SNR) requirement on the correlation for adequate receiver performance.

What is needed is an improved UWB receiver architecture which is operable to provide the necessary signal gain while preferably reducing the SNR required from front-end amplifier and correlator.

SUMMARY

The present invention provides an improved UWB receiver architecture which is operable to provide high signal gain while reducing the gain-bandwidth product of an implemented front-end amplifier, or removing the necessity for it altogether. The new UWB receiver is especially suited to integrated circuit form, thereby further facilitating the system's use in short range high speed wireless electronics.

The present invention includes an ultra wideband receiver system operable to process a high order Gaussian pulse. The UWB receiver system includes an integrator group, a correlator circuit and a comparator circuit. The integrator group includes an input coupled to receive the high order Gaussian pulse and an output coupled to the correlator circuit, the integrator group having two or more successively coupled integration stages, each integration stage operable to integrate, over a predefined time period, the signal received thereby, the integrator group operable to output, in response, a lower order Gaussian pulse. The correlator circuit is coupled to receive the lower order Gaussian pulse, and is operable to output a correlated output signal corresponding to the correlation between the lower order Gaussian pulse and a predefined reference signal. The comparator circuit is coupled to receive the correlated output data, and is operable to compare the correlated output data to one or more predefined values for construct a data stream representing modulation data of the high order Gaussian pulse.

These and other features of the invention will be more clearly understood when viewed in light of the following drawings and detailed description of exemplary embodiments.

BRIEF DESCRIPTION OF THE DRAWINGS

FIGS. 3A and 3B illustrates an ultra wideband receiver and corresponding method for processing high order Gaussian pulses in accordance with one embodiment of the present invention.

For clarity, previously identified features retain their reference indicia in subsequent drawings.

DETAILED DESCRIPTION OF EXEMPLARY EMBODIMENTS

General Overview

As known in the art, a Gaussian pulse has the form:

$$p(t)=(1-2(\pi ft)^2)e^{-(\pi ft)^2} \quad (1)$$

Eq. (1) represents a $0^{th}$ order Gaussian pulse, and higher order pulses are obtained by differentiating the Gaussian form shown in Eq. (1). For example, a second order pulse is obtained by taking the second derivative of Eq. (1). As used herein, the term "high order" in the context of Gaussian pulses denotes a signal order of 2 or higher.

Figure 1:
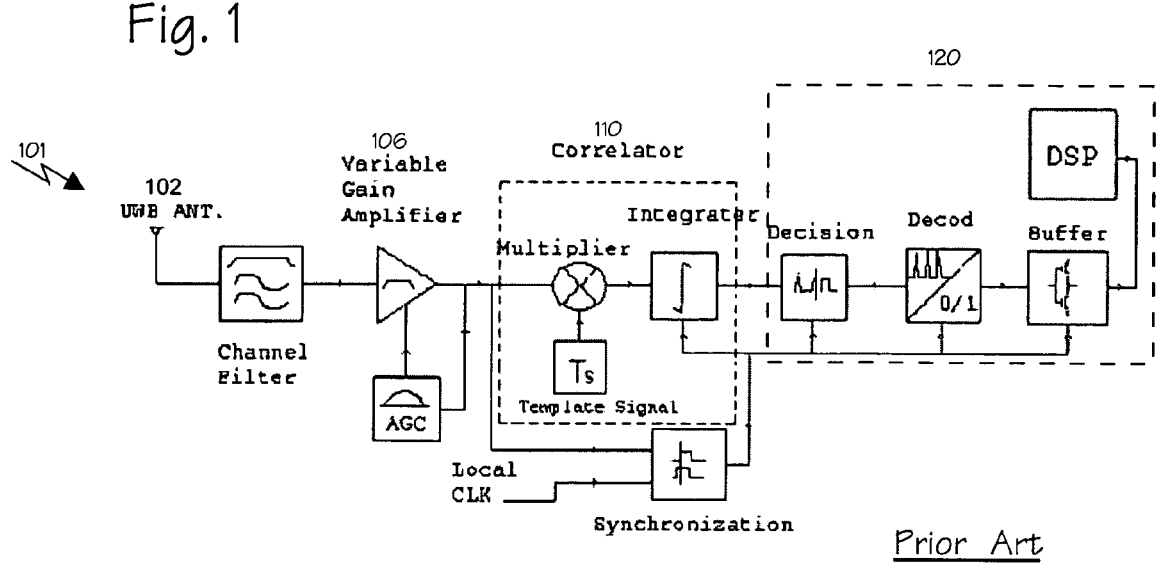
FIG. 1 illustrates a conventional ultra wideband receiver known in the art.
Figure 2:
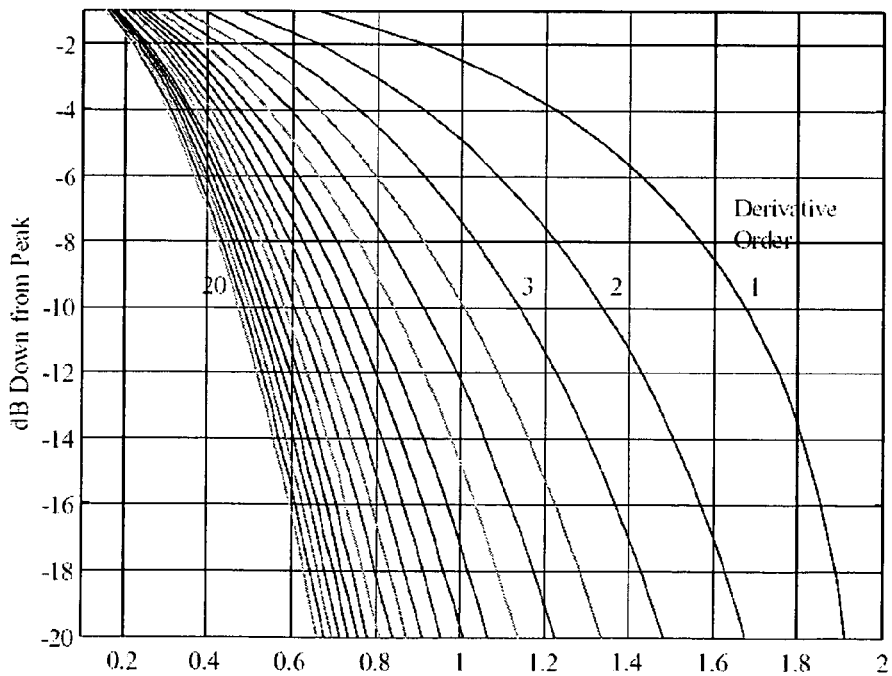
FIG. 2 illustrates a graph showing fractional bandwidth versus signal order of a Gaussian pulse.

FIG. 2 illustrates a graph showing fractional bandwidth versus signal order of a Gaussian pulse. As shown, the fraction bandwidth of the pulse quickly decreases with increasing order. In particular, the fractional bandwidth of a $5^{th}$ order Gaussian pulse is approximately 50% of that of a $0^{th}$ order Gaussian pulse, whereas the center frequency remains substantially the same. Further in the time domain, the peak-peak amplitude increases, and the pulse width decreases compared to the $0^{th}$ order pulse. Analysis has shown that the change in peak-peak amplitude for the $5^{th}$ order pulse is at least 500 times, or >40 dB compared to a $0^{th}$ order pulse. The narrow time domain nature of high-order Gaussian pulses, as will be shown below, allows for the relatively noise free amplification and recovery of the signal, even in high noise, multi-path environments.

In the following section, a $5^{th}$ order Gaussian pulse signal will be described and analyzed.

In the analysis, an assumption of an additive white Gaussian noise (AWGN) channel is adopted. An integration stage is provided as having sufficient bandwidth and unit amplifier gain:

$$\int_{-\infty}^{+\infty} h(\tau)d\tau = 1 \quad (2)$$

The received signal with AWGN may be written as:

$$S_r^1(t) = S_{Gaussian}^5(t) + S^0_{AWGN} = S_{Gaussian}^5(t) + S_{channel\_noise} \quad (3)$$

Where the superscripts are the order or the order related variables.

When signal passes through the first integrator, the response is as:

$$S_r^1(t) = \int_{-\infty}^{+\infty} h(t-\tau)S_r(t)d\tau \quad (4)$$
$$= \int_{-\infty}^{+\infty} h(t-\tau)S_{Gaussian}^5(t)d\tau + \int_{-\infty}^{+\infty} h(t-\tau)S_{AWGN}^0 d\tau$$

The first quantity to the right of the equal sign in Eq. 4 is the response of the interested signal. Furthermore:

$$\int_{-\infty}^{+\infty} h(t-\tau)S_{Gaussian}^5(t)d\tau = S_{Gaussian}^4(t) \quad (5)$$

The second quality to the right of the equal sign in Eq. 4 is the response of the AWGN. The AWGN is passed through a linear time invariant system, producing another AWGN. The mean and the deviation of the response AWGN signal can be obtained after a brief derivation:

$$m^1 = E\left[\int_{-\infty}^{+\infty} h(\tau)S_{AWGN}(t-\tau)d\tau\right]$$
$$= E(S_{AWGN})\int_{-\infty}^{+\infty} h(\tau)d\tau = m^0$$
$$= m_{channel\_noise} = 0$$
$$R^1(\tau) = E[S_{AWGN}^0(t)S_{AWGN}^0(t-\tau)]]$$
$$= \int\int_{\infty} h(\tau_1)h(\tau_2)E\begin{bmatrix} S_{AWGN}^0(t-\tau_1) \\ S_{AWGN}^0(t+\tau_1-\tau_2) \end{bmatrix} d\tau_1 d\tau_2$$
$$= R^0(\tau)$$
$$= R_{channel\_noise}(\tau)$$
$$D^1 = \sqrt{R^1(0)} = \sqrt{R^0(0)} = D_{channel\_noise} \quad (6)$$

The deviation gives the amplitude or Energy of the Gaussian noise in time domain, and accordingly, one observes from Eq. (6) that the noise in not amplified.

Therefore, the input signal to next integration stage can be written as:

$$S_r^4(t) = S_{Gaussian}^4(t) + S_{AWGN} = S_{Gaussian}^4(t) + S_{channel\_noise} \quad (6)$$

The aforementioned procedures are repeated until the signal passes through a series (in this case 5) integration stages to produce a $0^{th}$ order signal. The resultant signal can be expressed as:

$$S_r^0(t) = S_{Gaussian}^0(t) + S_{channel\_noise}$$

Thus, the signal's form allows for relatively noise-free gain. Further as known and will be shown in greater detail below, the integration of a high order Gaussian pulse to a lower order signal produces a significant increase in the peak-peak amplitude, thus translating to significant signal gain for the $0^{th}$ order signal. Thus, by a process of successively integrating a high order Gaussian pulse, a high degree of relatively noise-free signal gain can be achieved. This process is employed in the present invention to process high order Gaussian pulse signals in ultra wideband receivers, the architecture and operation of which are now presented.

UWB Receiver Architecture & Operation

FIG. 3A illustrates an ultra wideband receiver in accordance with one embodiment of the present invention. As illustrated, the UWB receiver 300 includes an UWB antenna 304, a channel filter 306, an integrator group 310, a synchronization circuit 320, a correlator 330, and a comparator 340. The UWB antenna 304 is configured to receive a high order (order 2 or higher) Gaussian modulated pulse ("high order pulse" herein), the frequency spectrum of which is 3.1-10 GHz in the United States. Various types of UWB antenna are known in the art, however, any antenna structure or similar receiving means which is operable to efficiently capture a signal over the particular UWB spectrum may be used.

Channel filter 306 may be of any particular filter type (e.g., highpass, lowpass, bandpass, bandstop, etc.) operable to provide the desired attenuation to the received high order pulse. As will be further shown below, the integrator group 310 provides a significant amount of relatively noise-free signal gain, thus reducing or eliminating the need for traditional front end signal amplification. Accordingly, one embodiment of the UWB receiver 300 omits signal amplification (e.g., a low noise amplifier or LNA) ahead of the integrator group 310. Such an architecture provides advantages in requiring fewer circuit components and less power to operate. The invention is not limited to an architecture which omits an amplifier ahead of the integrator group 310, and a LNA can used to provide signal gain to the high order pulse 305 before the signal integrator group 310 in an alternative embodiment. In such an embodiment, the gain- bandwidth product may be relaxed, as the signal integration process provides much, if not all, of the signal gain needed to sufficiently process the received signal. For example, the bandwidth of the front-end amplifier may be relaxed to provide gain only over a relatively narrow portion of the UWB spectrum.

The integrator group 310 includes two or more successively coupled integration stages 311-313, each integration stage operable to integrate the high order pulse it receives over a predefined integration time period, thereby producing a modulated Gaussian pulse of one degree lower order at the output. The process is repeated by the subsequent integrator stage, the integrator group 310 producing at the output, a lower order Gaussian pulse 315 ("lower order pulse" herein). In a particular embodiment, the lower order pulse 315 is a $0^{th}$ order Gaussian pulse, the integrator group 310 including the appropriate number of stages integrator to reduce the received high order pulse 305 to a $0^{th}$ order Gaussian pulse. Further specifically, the integration time period over which the stages 311-313 integrate may be of the same duration. Alternatively, each integration stage may have a different integration time period, for example, successive integration stages may have successively longer integration periods. The term "successive integration" includes, but is not limited to immediately successive integration processes, as the system and method may include one or more intervening structures or functionality between the integrating stages or processes.

The integrator group 310 optionally includes an automatic gain control circuit 316 which is operable to control the gain of one or more of the integration stages 311-313. Particularly, the AGC circuit 316 has an input coupled to receive the lower order pulse 315 and a control output, whereby the AGC circuit 315 supplies a control signal 317 operable to control amplitude gain of the integration stages 312 to which it is coupled, based upon the amplitude of the lower order pulse 315. In a further embodiment, the automatic gain control circuit is operable to control, based upon the lower order Gaussian pulse, the integration time period of the one or more integration stages to which it is coupled.

Further particularly, the integrator group 310 supplies two synchronization signals; the lower order pulse 315 which additionally functions as a fine synchronization signal, and a course integration signal which is the output of another of the integration stages (e.g., shown as the output of integration stage 312 in FIG. 3A). The synchronization circuit 320 receives the coarse and fine synchronization signals 314 and 315, as well as a local clock signal 321, and generates a reference synchronization signal 322. The correlator 330 includes a multiplier 332 operable to receive the lower order pulse 315 and a reference signal 331, the multiplier 332 producing, in response, signal 333 which represents a pulse width narrowed version of the lower order pulse 315. An integrator 334 is operable to integrate the pulse width modulated signal 333 over a predefined time period, thereby producing a correlated output signal 335 which represents the correlation between the lower order pulse 315 and the reference signal 331. Reference synchronization signal 322 is supplied to the integrator 334 for synchronize the timing of the integration process. A comparator 340 is operable to compare the correlated output data 335 to one or more predefined values, the result of said comparison being the construction of a data stream which represents the modulation data. It is noted that because of the significant low noise gain provided via the group integrator 310, the SNR of the correlator 330 is relaxed compared to traditional UWB receiver systems.

In a particular embodiment, the integrator group 310, the synchronization circuit 320, correlator 330 and comparator 340 are monolithically formed on an integrated circuit. The channel filter 306 may be included in the integrated circuit, or alternatively, fabricated off chip and coupled to the integrated circuit via connection means such as bond wire or ribbon. Connection to the ultra wideband antenna 304 may be similarly achieved. The aforementioned integrated circuit may be fabricated using a variety of different semiconductor processing techniques, including CMOS, BiCMOS, SiGe, GaAs, as well as others. Referring now to FIG. 3B in which an exemplary method of the receiver's operation is described, initially at 351 a high order Gaussian pulse 305 is successively integrated to produce a lower order Gaussian pulse 315 (lower order pulse). This operation is achieved by means of the integrator group 310, in which two or more integration stages 311-313 are used to perform the integration operations. In a particular embodiment, the number of integration stages 311-313 provided and the number of respective successive integrations performed are such that the received high order pulse 305 is reduced to a $0^{th}$ order Gaussian pulse 315. As noted above, the integration time period for each integrations stage 311-313 may the substantially the same or different, one embodiment of the latter case being successively longer integration periods in order to capture more of the successively wider Gaussian time domain pulse.

Next at 352, the lower order pulse is correlated to a reference signal 331, resulting in the generation of a correlated output signal. This operation, in a specific embodiment, is carried out in a by the correlator circuit 330 of FIG. 3A. At 353, the correlated output signal 335 is compared to one or more predefined values to produce an output data stream 342 which represents the modulation data. The one or more predefined values may be a fixed voltage or threshold value, or a dynamic adjusting value controlled by digital part and based on system response. In either case, the comparator 340 is operable to construct an output data stream with bit value(s) which correlate closest to the signal state of the correlated output signal 335.

Operation 351 optionally includes various additional processes in accordance with the present invention. In one embodiment, the successive integration process includes producing (i) a fine synchronization signal 315 from the last of the successive integrating processes, and (ii) a coarse synchronization signal 314 from another of the successive integrating processes. In such an embodiment, the correlation operation of 352 includes the processes of generating a reference synchronization signal based upon a supplied clock signal 321, the fine synchronization signal 315 and the coarse synchronization signal 314, producing a pulse-width modulated version of the lower order pulse 333, and using the reference synchronization signal 322 to synchronize integration of the pulse-width modulated signal 333 to produce the correlated signal 335. In a further specific embodiment, the comparing operation also includes using the reference synchronization signal 322 to synchronization of the comparing process 353.

In a further optional embodiment, operation 351 includes controlling the amplitude of one or more of the successive integration operations, using an automatic gain control circuit 316. In such an operation, the process includes receiving the lower order pulse 315 and, based thereon, outputting a control signal 317 to control the amplitude of the integration stage. Alternatively in operation 351, the automatic gain control circuit operates to control, based upon the lower order Gaussian pulse, the integration time period of the one or more integration stages to which it is coupled.

Further optionally as noted above, the method omits signal amplification prior to the successive integration operation in 351. Omissions of signal amplification allows for lower power consumption and reduced circuit size, features which are especially advantageous in integrated circuit structures. Alternatively, front-end amplification may be employed to supplement the signal gain provided via the integrator group 310. When the method includes front-end amplification, the gain-bandwidth product of such a front-end process may be reduced, as the signal integration process contributes most of the needed signal gain. For example, front-end amplification may be bandlimited to a relatively narrow region of the UWB spectrum, as the signal integration process in 351 provides sufficient gain over the remaining UWB spectrum.

Figure 4:
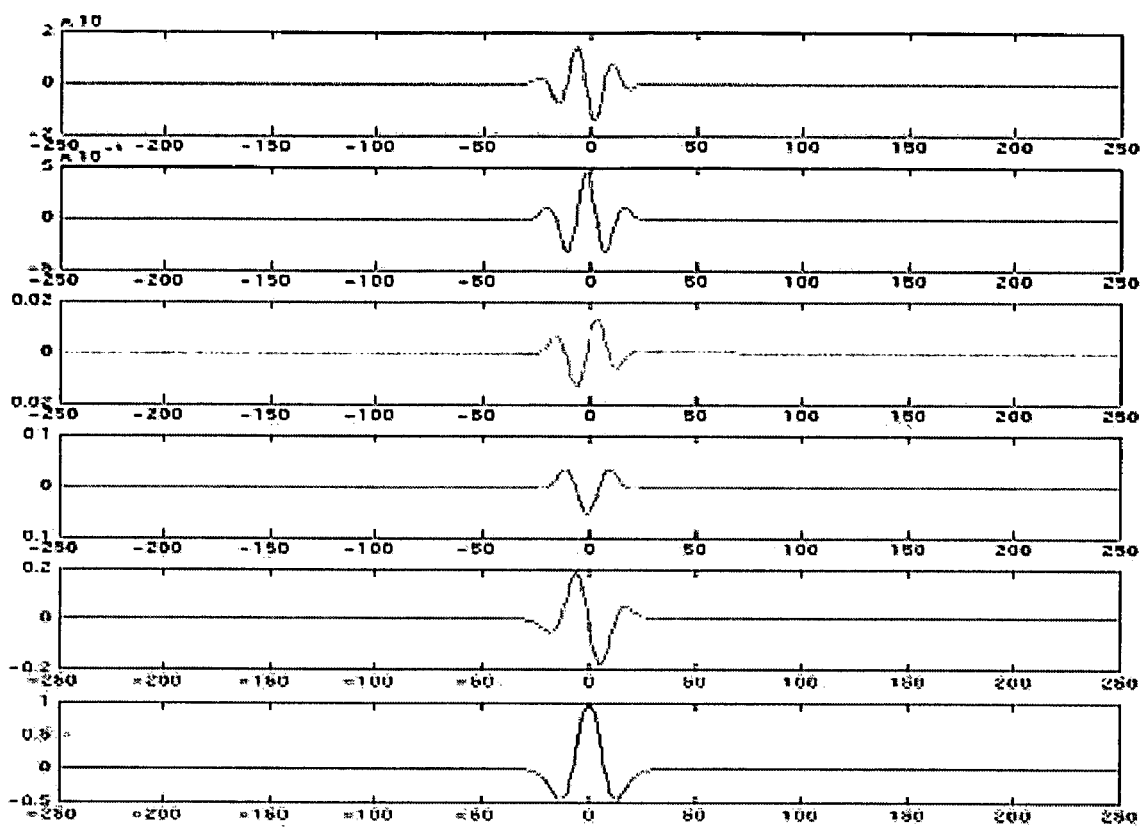
FIG. 4 illustrates a graph showing the time domain waveform of a high order Gaussian pulse as it is processed by the integration stages in accordance with the present invention.

FIG. 4 illustrates a graph showing the time domain waveform of a 5th order Gaussian pulse as it is processed by the integration stages 311-313 in accordance with the present invention. Trace 410 shows the waveform for a $5^{th}$ order pulse and trace 420 shows a resulting $4^{th}$ order waveform after one integration operation. Traces 430, 440, 450 and 460 represent $3^{rd}$, $2^{nd}$, $1^{st}$ and $0^{th}$ order pulse waveforms, respectively.

As can be seen, the peak-peak signal amplitude increases with decreasing signal order, thereby providing increased signal gain.

Figure 5:
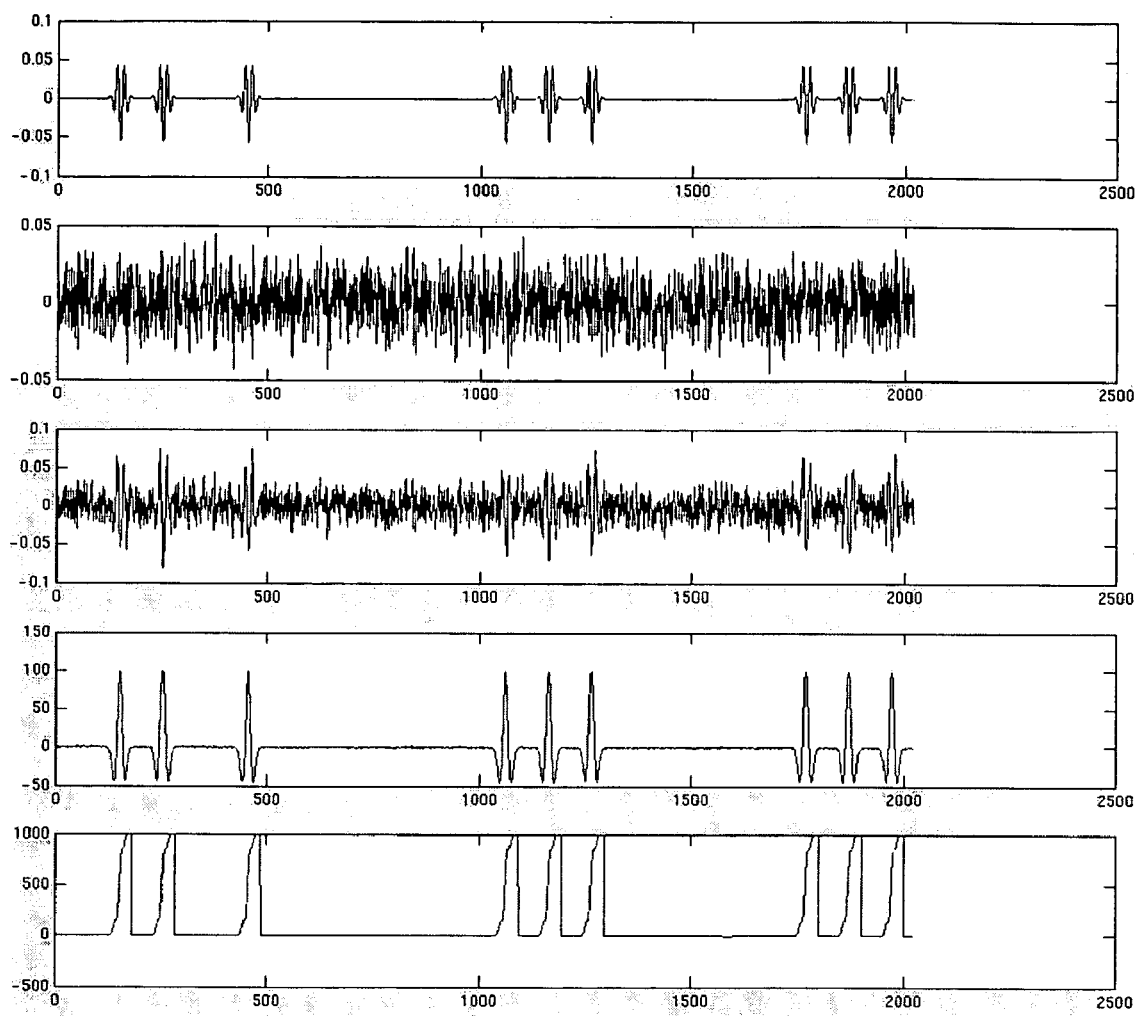
FIG. 5 illustrates a graph showing the time domain waveform of a high order Gaussian pulse train as it is processed by an ultra wideband receiver in accordance with the present invention.

FIG. 5 illustrates a graph showing the time domain waveform of a 5th order Gaussian pulse train as it is processed by an ultra wideband receiver in accordance with the present invention. The simulation was performed using MATLAB® 6.2 simulation software with ideal receiver circuits described above.

Trace 510 shows a train of high order Gaussian pulses, trace 520 shows channel additive Gaussian white noise (AGWN), and trace 530 shows the pulse train received at the UWB receiver including the effects of the AWGN. Trace 540 shows the processed pulse train after processing by the integrator group 310, and trace 550 shows the processes pulse train after the correlator circuit 330. The data, particularly traces 530 and 540, show that the processes of successively integrating the high order pulse is effective in providing very good signal gain and noise suppression, thus enabling signal recovery with high sensitivity and low bit error rate (BER).

Figure 6A:
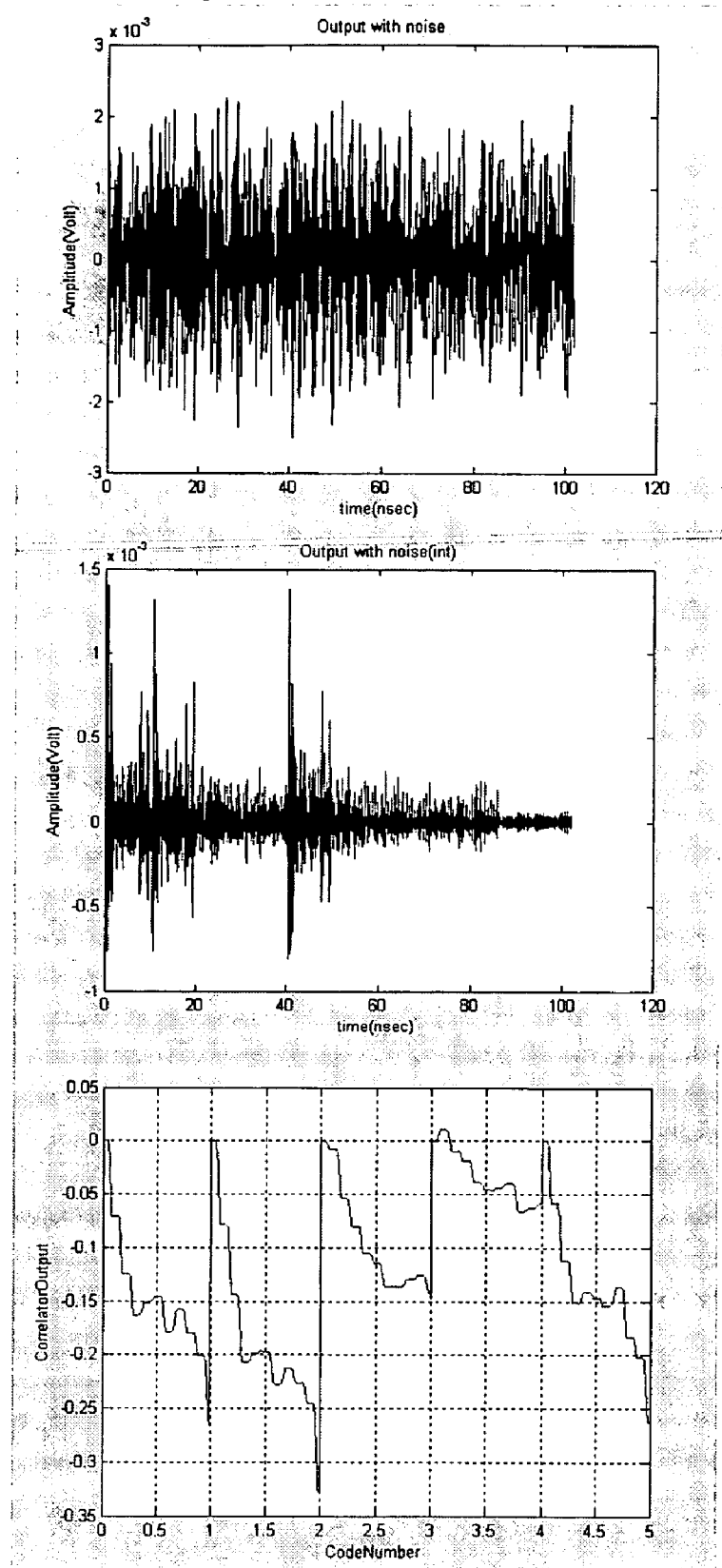
FIG. 6A illustrates a graph showing the time domain waveform of a high order Gaussian pulse train affected by multipath and additive white Gaussian noise effects as it is processed by an ultra wideband receiver in accordance with the present invention.

FIG. 6A illustrates a graph showing the time domain waveform of a high order Gaussian pulse train affected by multipath and additive white Gaussian noise effects as it is processed by an ultra wideband receiver in accordance with the present invention. The transmitted signal is simulated having characteristics allowed by the UWB guidelines in the United States. The UWB receiver was simulated using the above described circuits using MATLAB® 6.2 simulation software.

Trace 610 shows the time domain waveform of a fifth order pulse train received approximately 8 meters away from the transmitting source and in a multi-path AWGN noise environment. Trace 620 shows the pulse train after the integrator group 310 upon completion of five successive integration processes. Trace 630 shows the pulse train at the output of the correlator 330, indicating successful recovery of the modulation data.

Figure 6B:
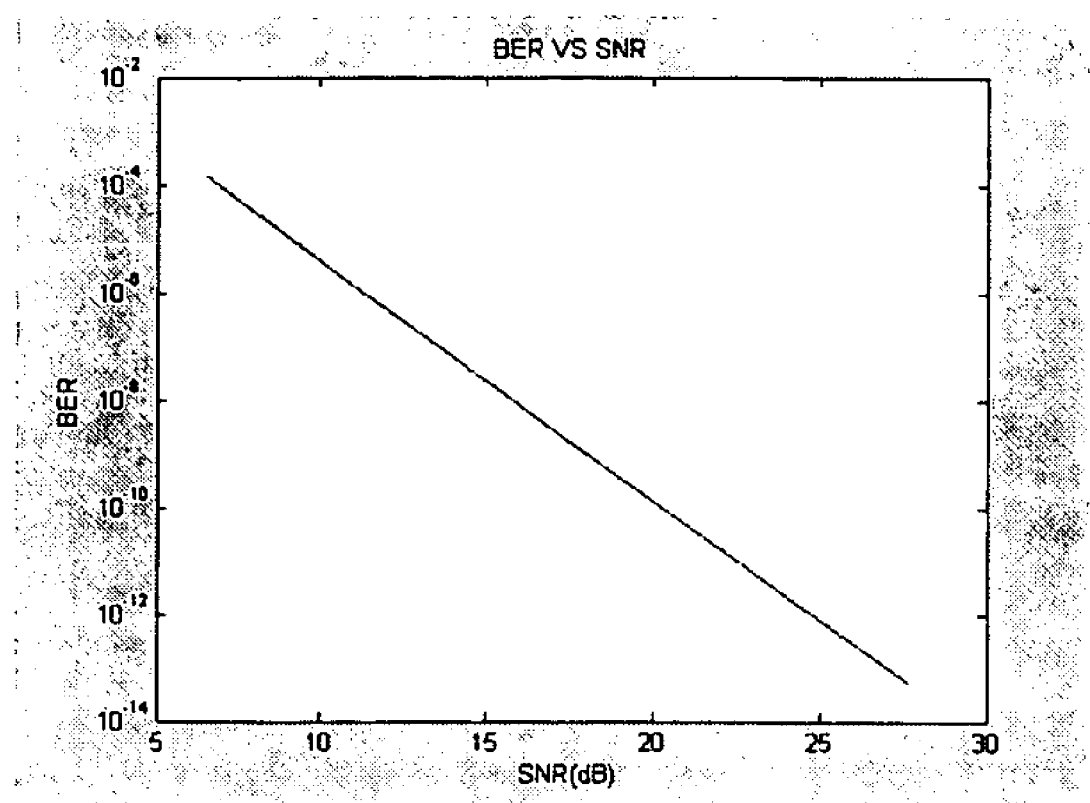
FIG. 6B illustrates a graph showing the BER as a function of input SNR for an ultra wideband receiver in accordance with one embodiment of the present invention.

FIG. 6B illustrates a graph showing the BER as a function of input SNR for the UWB receiver 300 described in FIG. 6A. As shown, the BER response indicated very good performance.

As readily appreciated by those skilled in the art, the described processes may be implemented in hardware, software, firmware or a combination of these implementations as appropriate. In addition, some or all of the described processes may be implemented as computer readable instruction code resident on a computer readable medium (removable disk, volatile or non-volatile memory, embedded processors, etc.), the instruction code operable to program a computer of other such programmable device to carry out the intended functions.

The foregoing description has been presented for purposes of illustration and description. It is not intended to be exhaustive or to limit the invention to the precise form disclosed, and obviously many modifications and variations are possible in light of the disclosed teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An ultra wideband (UWB) receiver operable to process a high order Gaussian pulse, the UWB receiver comprising:
    an integrator group having an input coupled to receive the high order Gaussian pulse and an output, the integrator group comprising a plurality of successively coupled integration stages, each integration stage operable to integrate, over a predefined time period, the signal received thereby, the integrator group operable to output, in response, a lower order Gaussian pulse;
    a correlator circuit coupled to receive the lower order Gaussian pulse, the correlator circuit operable to output a correlated output signal corresponding to the correlation between the lower order Gaussian pulse and a predefined reference signal; and
    a comparator circuit coupled to receive the correlated output data, the comparator circuit operable to compare the correlated output data to one or more predefined values for constructing a data stream representing modulation data of the high order Gaussian pulse.

2. The UWB receiver of claim 1, wherein each of the successively coupled integration stages is operable to integrate the signal over substantially the same time period.

3. The UWB receiver of claim 1, wherein each of the successive coupled integration stages is operable to integrate the signal received thereby over a respective successively longer time period.

4. The UWB receiver of claim 1, wherein the UWB receiver does not include a signal amplifier coupled ahead of the integrator group.

5. The UWB receiver of claim 1, further comprising a synchronization circuit operable to generate a reference synchronization signal,
    wherein the output of the last of the successively coupled integration stages comprises a fine synchronization signal;
    wherein the output of another of the integration stages comprises a coarse synchronization signal; and
    wherein the synchronization circuit is operable to receive the fine and coarse synchronization signals and a clock signal, and based thereon, produces the reference synchronization signal.

6. The UWB receiver of claim 1, further comprising an automatic gain control circuit having an input coupled to receive the lower order Gaussian pulse and an output coupled to one or more of the integration stages, the automatic gain control circuit operable to control, based upon the lower order Gaussian pulse, the integration time period of the one or more integration stages to which it is coupled.

7. The UWB receiver of claim 1, further comprising:
    an antenna configured to receive the high order Gaussian pulse; and
    a filter having an input coupled to the antenna and an output coupled to the signal integrator, the filter for providing signal rejection at one or more predefined frequencies.

8. The UWB receiver of claim 1, wherein the signal integrator, the synchronization circuit, the correlator circuit, and the comparator circuit are formed on an integrated circuit.

9. The UWB receiver of claim 1, wherein the filter, signal integrator, the synchronization circuit, the correlator circuit, and the comparator circuit are formed on an integrated circuit.

10. The UWB receiver of claim 1, wherein the lower order Gaussian pulse comprises a $0^{th}$ order Gaussian pulse.

11. The UWB receiver of claim 10, wherein the integrator group comprises five successively coupled integration stages, and wherein the high order Gaussian pulse received at the first integration stage comprises a $5^{th}$ order Gaussian pulse signal.

12. The UWB receiver of claim 1, further comprising a signal amplifier is coupled ahead of the integrator group and operable to amplify the amplitude of the received UWB signal over a limited portion of the UWB signal bandwidth.

13. A method for operating an ultra wideband receiver to recover data modulated on a high order Gaussian pulse signal, the method comprising:

successively integrating a received high order Gaussian pulse signal to produce a lower order Gaussian pulse;

correlating the lower order Gaussian pulse signal with a reference signal to generate a correlated output signal; and comparing the correlated output signal to one or more predefined values to recover the data modulated onto the high order Gaussian pulse.

14. The method of claim 13, wherein successively integrating comprises successively integrating the high order Gaussian pulse to produce a $0^{th}$ order Gaussian pulse.

15. The method of claim 13, wherein successively integrating the received high order Gaussian pulse includes:

producing (i) a fine synchronization signal from the last of the successive integrating processes, and (ii) a coarse synchronization signal from another of the successive integrating processes, and wherein correlating comprises:

generating a reference synchronization signal based upon a supplied clock signal, the fine synchronization signal and the coarse synchronization signal;

producing a pulse width modulated version of the lower order Gaussian pulse, and using the generated reference synchronization signal to synchronize correlation of the lower order Gaussian pulse signal to a reference signal.

16. The method of claim 13, wherein successively integrating the received UWB high order Gaussian pulse signal includes controlling, based upon predefined characteristics of the lower order Gaussian pulse signal, the integration time period of one or more of the successive signal integrations.

17. The method of claim 13, wherein successively integrating comprises successively integrating the high order Gaussian pulse signal over substantially the same predefined integration period.

18. The method of claim 13, wherein successively integrating comprises successively integrating the high order Gaussian pulse signal over successively wider integration periods.

19. The method of claim 13, wherein amplifying the signal level of the high order Gaussian pulse is not performed prior to the successive integration operation.

20. The method of claim 13, wherein amplifying the signal level of the high order Gaussian pulse is performed prior to the successive integration operation over a limited portion of the spectrum of the UWB signal.

21. A computer program product, resident on a computer readable medium, for controlling an ultra wideband receiver to recover data modulated on a high order Gaussian pulse signal, the computer program product comprising:

instruction code to successively integrate a received high order Gaussian pulse signal to produce a lower order Gaussian pulse;

instruction code to correlate the lower order Gaussian pulse signal with a reference signal to generate a correlated output signal; and instruction code to compare the correlated output signal to one or more predefined values to recover the data modulated onto the high order Gaussian pulse.

22. The computer program product of claim 21, wherein the instruction code to successively integrate comprises instruction code to successively integrate the high order Gaussian pulse to produce a $0^{th}$ order Gaussian pulse.

23. The computer program product of claim 21, wherein the instruction code to successively integrating the received high order Gaussian pulse includes:

instruction code to produce (i) a fine synchronization signal from the last of the successive integrating processes, and (ii) a coarse synchronization signal from another of the successive integrating processes, and wherein the instruction code to correlate comprises:

instruction code to generate a reference synchronization signal based upon a supplied clock signal, the fine synchronization signal and the coarse synchronization signal;

instruction code to produce a pulse width modulated version of the lower order Gaussian pulse, and instruction code to use the generated reference synchronization signal to synchronize correlation of the lower order Gaussian pulse signal to a reference signal.

24. The computer program product of claim 21, wherein the instruction code to successively integrate the received UWB high order Gaussian pulse signal includes instruction code to control, based upon predefined characteristics of the lower order Gaussian pulse signal, the integration time period of one or more of the successive signal integrations.

25. The computer program product of claim 21, wherein the instruction code to successively integrate comprises instruction code to successively integrate the high order Gaussian pulse signal over substantially the same predefined integration period.

26. The computer program product of claim 21, wherein the instruction code to successively integrate comprises instruction code to successively integrate the high order Gaussian pulse signal over successively wider integration periods.

* * * * *